United States Patent [19]

Barrell

[11] Patent Number: 5,099,087
[45] Date of Patent: Mar. 24, 1992

[54] DECORATIVE COVER PLATE

[76] Inventor: John Barrell, 264-63 Langston Ave., Glen Oaks, N.Y. 11004

[21] Appl. No.: 624,551

[22] Filed: Dec. 10, 1990

[51] Int. Cl.⁵ .............................................. H02G 3/14
[52] U.S. Cl. .................................. 174/66; D8/351; D8/353
[58] Field of Search ............... 174/66, 67; 220/241, 220/242; D8/350, 351, 352, 353; D13/177

[56] References Cited

U.S. PATENT DOCUMENTS

| D. 118,174 | 12/1939 | Seward | D8/351 |
|---|---|---|---|
| D. 118,175 | 12/1939 | Seward | D8/351 |
| D. 118,176 | 12/1939 | Seward | D8/351 |
| D. 118,177 | 12/1939 | Seward | D8/351 |
| D. 118,178 | 12/1939 | Seward | D8/351 |
| D. 118,179 | 12/1939 | Seward | D8/351 |
| D. 155,088 | 9/1949 | Johnson | D8/351 |
| 2,211,818 | 8/1940 | Innis | 174/67 X |
| 2,916,733 | 12/1959 | Hirsch | 176/67 X |
| 3,530,230 | 9/1970 | Cormier et al. | 174/66 |
| 4,335,863 | 6/1982 | Rapps | 174/66 X |
| 4,810,833 | 3/1989 | Meyers | 174/67 |

Primary Examiner—Leo P. Picard
Assistant Examiner—David A. Tone
Attorney, Agent, or Firm—Michael I. Kroll

[57] ABSTRACT

A decorative cover plate is provided and consists of a plate member to cover and be attached to an electrical outlet in a wall. A sculptured member fits onto the top edge and upper portions of the side of edges of the plate member. A mechanism is also provided for removably attaching the sculptured member to the plate member.

10 Claims, 2 Drawing Sheets

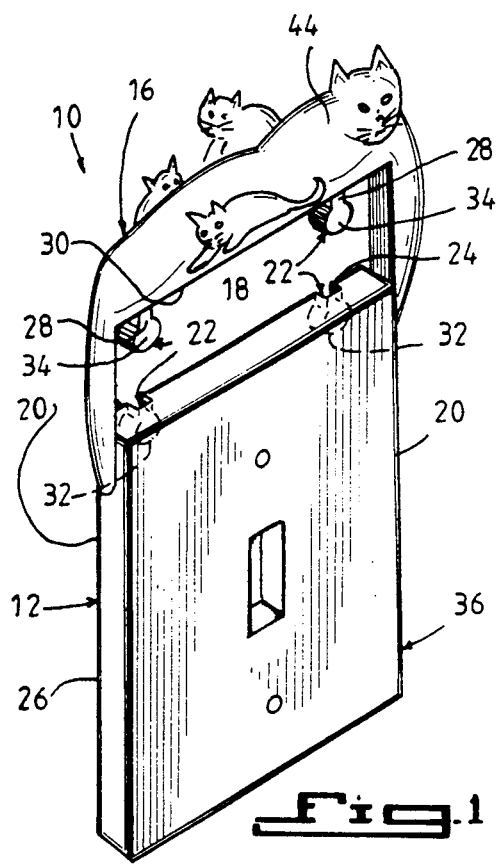
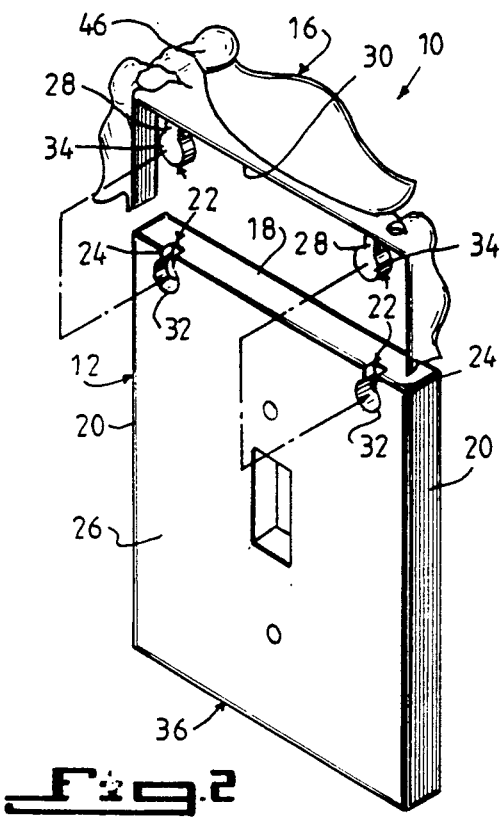
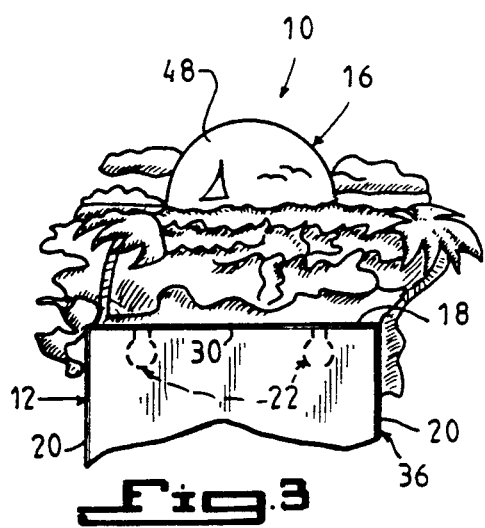
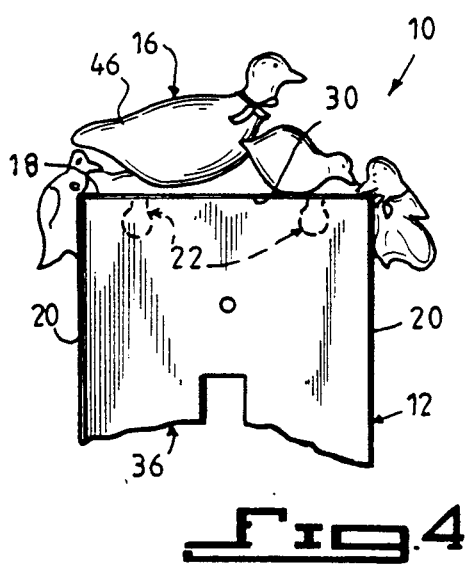

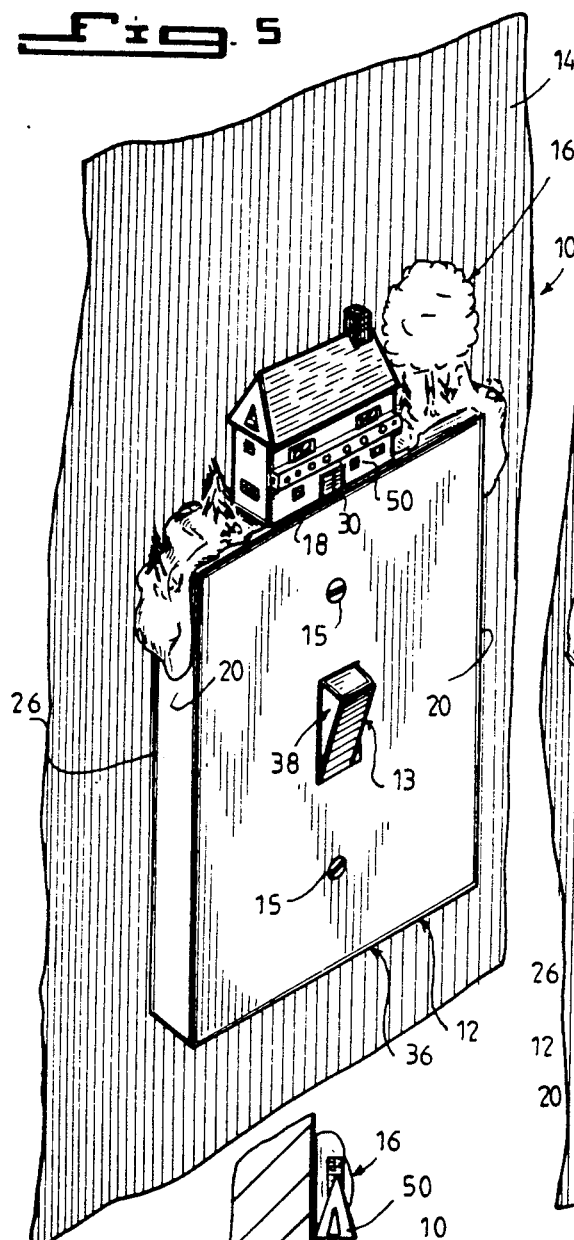
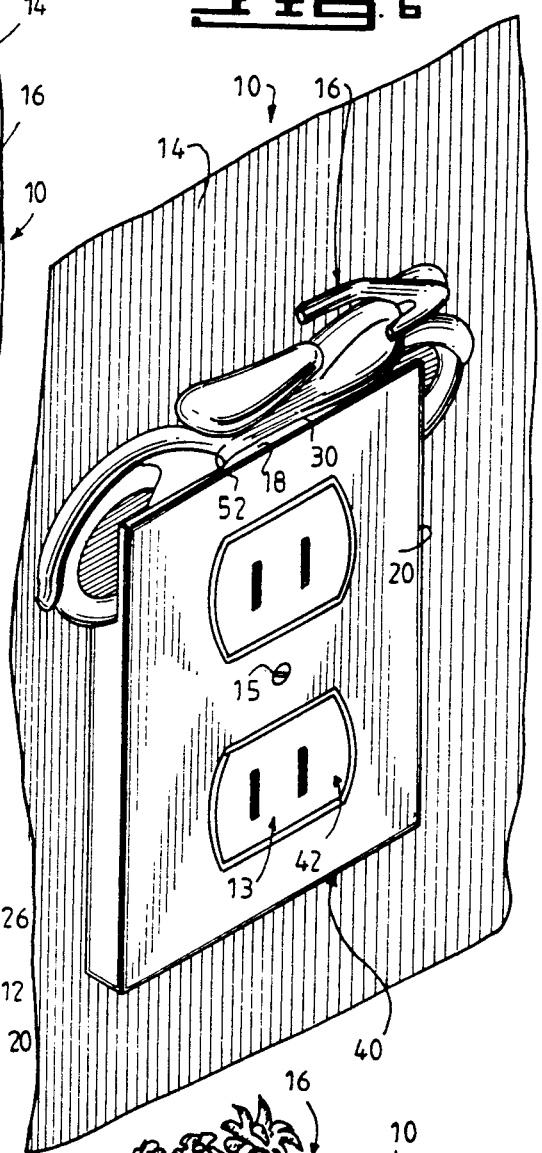
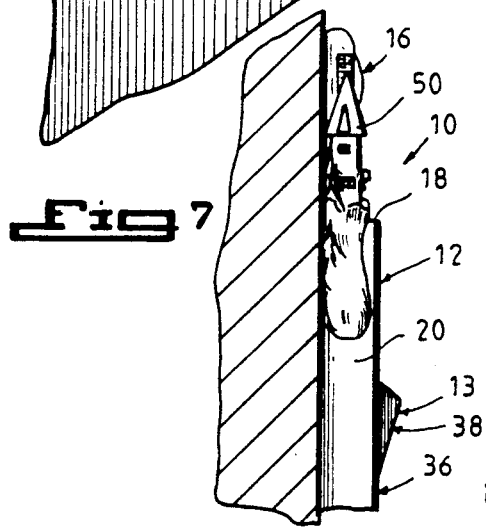
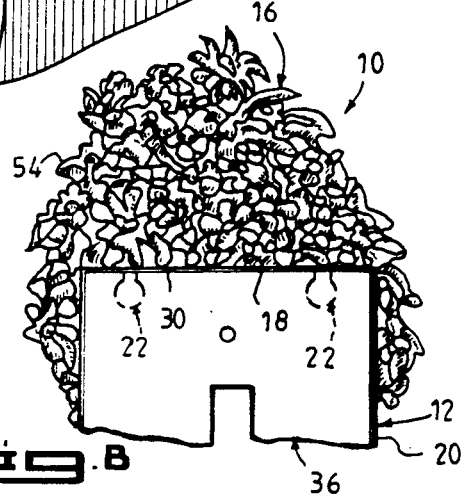

DECORATIVE COVER PLATE

BACKGROUND OF THE INVENTION

1. Field of the Invention

The instant invention relates generally to wall switches and receptacles and more specifically it relates to a decorative cover plate.

2. Description of the Prior Art

Numerous wall switches and receptacles have been provided in prior art that are adapted to include plates which enclose the junction boxes that the wall switches and receptacles are electrically mounted to. While these units may be suitable for the particular purpose to which they address, they would not be as suitable for the purposes of the present invention as heretofore described.

SUMMARY OF THE INVENTION

A primary object of the present invention is to provide a decorative cover plate that will overcome the shortcomings of the prior art devices.

Another object is to provide a decorative cover plate which includes a plurality of sculptured members that can be removably attached to the top edge of the cover plate to create various artistic configurations to the cover plate.

An additional object is to provide a decorative cover plate in which the cover plate has female sockets therein and the sculptured members have male plugs thereon which can fit into the female sockets to make the sculptured members interchangeable with the cover plate.

A further object is to provide a decorative cover plate that is simple and easy to use.

A still further object is to provide a decorative cover plate that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is a front exploded perspective view of the instant invention showing cats formed on the sculptured member.

FIG. 2 is a rear exploded perspective view of the invention showing geese formed on the sculptured member.

FIG. 3 is a front view with parts broken away of the invention showing a sunset formed on the sculptured member.

FIG. 4 is a front view with parts broken away of the invention with the sculptured member that is shown in FIG. 2.

FIG. 5 is a perspective view of the invention mounted over a switch on a wall, showing a house formed on the sculptured member.

FIG. 6 is a perspective view of the invention mounted over a receptacle on the wall, showing a motorcycle formed on the sculptured member.

FIG. 7 is a side view of the invention with parts broken away as shown in FIG. 5.

FIG. 8 is a front view with parts broken away of the invention showing flowers formed on the sculptured member.

DETAILED DESCRIPTION OF THE PREFERRED EMBODIMENTS

Turning now descriptively to the drawings, in which similar reference characters denote similar elements throughout the several views, the Figures illustrate a decorative cover plate 10 consisting of a plate member 12 to cover and be attached to an electrical outlet 13 in a wall 14 by mounting screws 15. A sculptured member 16 fits onto the top edge 18 and upper portions of the side edges 20 of the plate member 12. A mechanism 22 is also provided for removably attaching the sculptured member 16 to the plate member 12.

The removably attaching mechanism 22 includes the plate member 12 having a pair of spaced apart female slotted sockets 24 extending downwardly from the top edge 18 of the plate member 12 at the rear surface 26 thereof. The sculptured member 16 has a pair of spaced apart male plugs 28 extending downwardly from the bottom edge 30 of the sculptured member to fit into the female slotted sockets 24. Each female slotted socket 24 in the plate member 12 has an enlarged opening 32 at the lower end thereof. Each male plug 28 on the sculptured member 16 has an enlarged head 34 at the lower end thereof. The male plugs 28 must fit into the female slotted sockets 24 before the plate member 12 is attached to the electrical outlet in the wall 14, thus securing the sculptured member 16 to the plate member 12, until the plate member 12 is removed from the electrical outlet in the wall 14.

The plate member 12, as best shown in FIG. 5, is a switch plate 36 to be used in conjunction with the electrical outlet 13 that is a switch 38. The plate member 12, as best shown in FIG. 6, is a receptacle plate 40 to be used in conjunction with the electrical outlet 13 that is a receptacle 42.

The sculptured member 16 can typically be in the shape of cats 44, geese 46, a sunset 48, a house 50, a motorcycle 52, flowers 54 or any other configurations that are decorative. They are interchangeable with the plate member 12 and can come in a variety of matching colors with the plate member 12. The decorative cover plate 10 can be fabricated out of ceramic, metal, wood, plastic and any other durable materials.

LIST OF REFERENCE NUMBERS 10 decorative cover plate
12 plate member
13 electrical outlet
14 wall
15 mounting screw
16 sculptured member
18 top edge of 12
20 side edge of 12
22 removably attaching mechanism
24 female slotted socket in 12
26 rear surface of 12
28 male plug on 16
30 bottom edge of 16
32 enlarged opening in 24
34 enlarged head on 28
36 switch plate for 12
38 switch for 13

40 receptacle plate for 12
42 receptacle for 13
44 cats in 16
46 geese in 16
48 sunset in 16
50 house in 16
52 motorcycle in 16
54 flowers in 16

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A decorative cover plate comprising:
   a) a plate member to cover and be attached to an electrical outlet in a wall, said plate member having a pair of spaced apart female slotted sockets extending downwardly from the top edge of said plate member at the rear surface thereof;
   b) a sculptured member to fit onto the top edge and upper portions of the sides of said plate member, said sculptured member having a pair of spaced apart male plugs extending downwardly from the bottom edge of said sculptured member to fit into said female slotted sockets;
   c) means for removably attaching said sculptured member to said plate member.

2. A decorative cover plate as recited in claim 1, wherein said removably attaching means further includes:
   a) each of said female slotted sockets in said plate member having an enlarged opening at the lower end thereof; and
   b) each of said male plugs on said sculptured member having an enlarged head at the lower end thereof so that said male plugs must fit into said female slotted sockets before said plate member is attached to the electrical outlet in the wall, thus securing said sculptured member to said plate member, until said plate member is removed from the electrical outlet in the wall.

3. A decorative cover plate as recited in claim 2, wherein said plate member is a switch plate to be used in conjunction with the electrical outlet that is a switch.

4. A decorative cover plate as recited in claim 2, wherein said plate member is a receptacle plate to be used in conjunction with the electrical outlet that is a receptacle.

5. A decorative cover plate as recited in claim 2, wherein said sculptured member is in the shape of cats.

6. A decorative cover plate as recited in claim 2, wherein said sculptured member is in the shape of geese.

7. A decorative cover plate as recited in claim 2, wherein said sculptured member is in the shape of a sunset.

8. A decorative cover plate as recited in claim 2, wherein said sculptured member is in the shape of a house.

9. A decorative cover plate as recited in claim 2, wherein said sculptured member is in the shape of a motorcycle.

10. A decorative cover plate as recited in claim 2, wherein said sculptured member is in the shape of flowers.

* * * * *